June 10, 1924.
F. F. WAECHTER ET AL
1,497,619
BELT CONVEYER
Filed Dec. 6, 1920
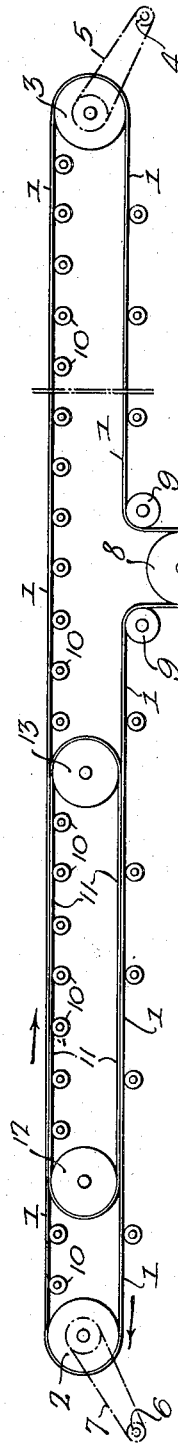
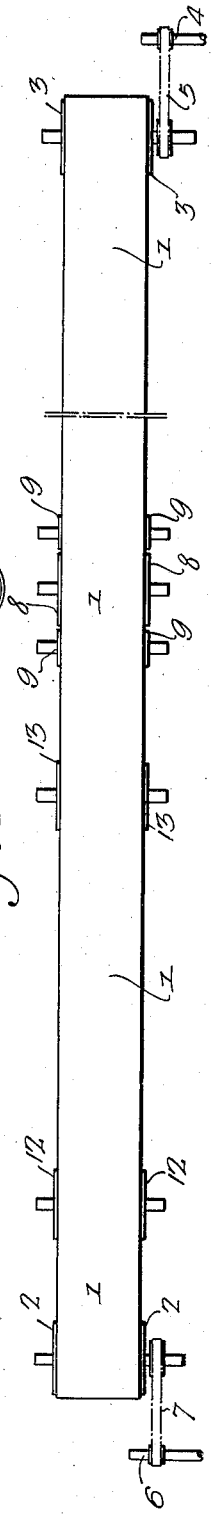
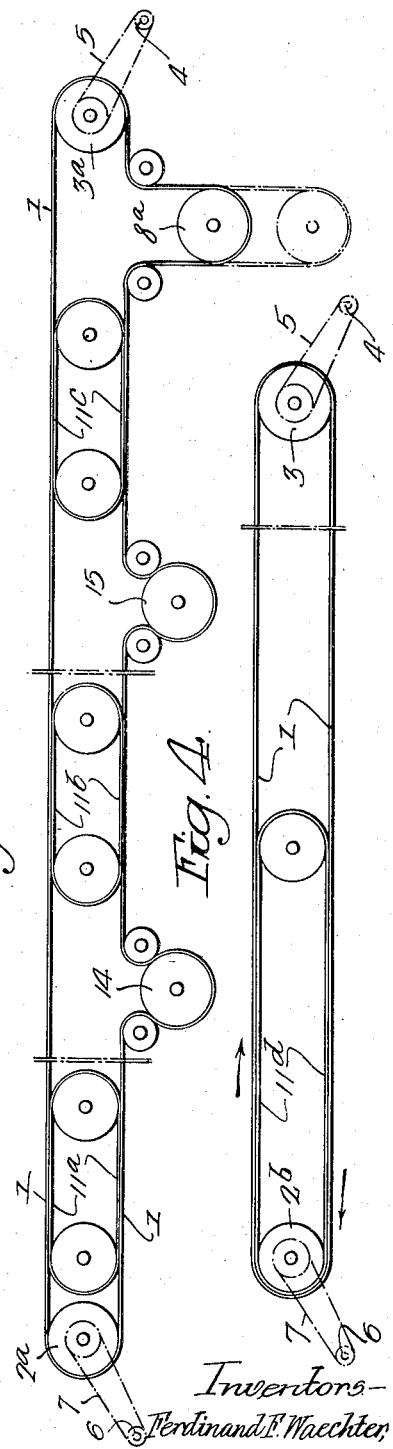

Patented June 10, 1924.

1,497,619

UNITED STATES PATENT OFFICE.

FERDINAND F. WAECHTER AND WILLIAM S. CAMPBELL, OF PHILADELPHIA, PENNSYLVANIA, ASSIGNORS TO LINK-BELT COMPANY, OF CHICAGO, ILLINOIS, A CORPORATION OF ILLINOIS.

BELT CONVEYER.

Application filed December 6, 1920. Serial No. 428,537.

*To all whom it may concern:*

Be it known that we, FERDINAND F. WAECHTER and WILLIAM S. CAMPBELL, citizens of the United States, and residents of Philadelphia, county of Philadelphia, State of Pennsylvania, have invented certain Improvements in Belt Conveyers, of which the following is a specification.

One object of our invention is to provide means for driving extremely long belts which are used to convey material, and which ordinarily must be made very heavy and consequently take considerable power.

A further object of the invention is to provide a conveyer belt of this type with an uninterrupted carrying surface, so as to reduce the wear due to the loading of a series of belts at different points which ordinarily make up a long conveyer.

A still further object of the invention is to provide an auxiliary drive for the main belt which is located at a point distant from the main drive and which applies tension to the return run of the belt and this is accomplished by placing a booster belt between the upper and lower runs of the main belt, so that the power exerted by the auxiliary drive on the lower run of the belt will be transmitted through the booster belt to the carrying run and where the belt is of extreme length a series of these auxiliary power mechanisms may be used which act upon the return run of the main belt and upon the carrying run through independent booster belts.

Figure 1 is a side view of a belt conveyer illustrating our invention;

Figure 2 is a plan view;

Figure 3 is a view showing a series of booster belts where the belt is of extreme length, and Figure 4 is a view showing the booster passing around the same wheel as the main belt.

Referring to Figures 1 and 2, 1 is a conveyer belt which may be five hundred feet or more in length and this belt passes around a wheel 2 at one end and a wheel 3 at the opposite end. The wheel 3 is the main driving wheel driven from a shaft 4 through a gearing or a belt 5. The wheel 2 is also driven from an auxiliary power shaft 6 by gearing or a belt 7. 8 is a take up wheel which can be adjusted in the ordinary manner and 9 are guide wheels directing the belt to and from the take up wheel. The carrying run of the belt is supported on rollers 10 of the usual form and the lower run is also supported at intervals as shown.

Long conveying belts are subject to great strains due to their length and have to be made very heavy, which adds also to the weight of the belt and necessarily increases the power used in driving the same. It also materially increases the cost of the belt. By our invention we can provide a belt which can be made comparatively light, thus reducing the expense and the weight of the belt. This object is attained by locating what we term a "booster belt" 11 between the upper and lower runs of the main belt and this belt passes around wheels 12 and 13 which are not driven by outside power but are so proportioned that the lower run of the "booster belt" is in contact with the lower run of the main belt and the upper run of the "booster belt" is in contact with the upper run of the main belt. This "booster belt" passes in between the rollers 10 and the upper run of the belt. By this construction the lower run of the lower belt is driven by friction from the lower run of the main belt and the power exerted on the lower run of the main belt by the auxiliary power mechanism is transmitted to the upper run of the main belt through the "booster belt." By distributing the power in this manner, a much lighter belt can be used than heretofore.

In Fig. 3 we have illustrated a modification in which there are three auxiliary driving mechanisms $2^a$, 14 and 15 and a booster belt is shown beyond each mechanism. The booster belt $11^a$ is between the auxiliary driving wheel $2^a$ and the drive 14 and booster belt $11^b$ is located between the drive 14 and the drive 15 and another booster belt $11^c$ is between the auxiliary drive 15 and the take up $8^a$. A belt arranged in this manner can be of great length.

While we show the booster belts of substantially the same width as the main belt, they may be narrower if desired.

In Fig. 4 we have illustrated a modification in which the booster belt $11^d$ passes around the auxiliary driving wheel $2^b$.

Conveying belts of this type are used in conveying coal and similar material and are consequently very heavy when of great length and the strength of the belt must be proportionate to its length. Where a belt is of extreme length it is almost impossible to make the belt thick enough to carry the intense strains such for instance as when the length is of one thousand feet or more. The driving wheels 3 and 3ª in Fig. 1 and Fig. 3 respectively are the main driving wheels while the wheels 2 and 2ª are auxiliary driving wheels but use considerably less power although they travel at the same speed as the main driving wheels.

We claim:

1. The combination in a belt conveyer having a carrying run and a return run, of a main drive for the belt at the discharge end of the conveyer; an auxiliary drive for the return run at the opposite end of the belt; and a booster belt located between the carrying run and the return run of the main belt and in contact with both the carrying run and the return run so as to provide an uninterrupted carrying surface for the main belt.

2. The combination of a conveying belt; means for driving the same; take-up mechanism therefor; a series of intervening direct drives for imparting motion to the main belt; and a series of independent booster belts in contact with the carrying run of the main belt, and located between the several drives so as to transmit the power of the return run of the main belt to the carrying run of said main belt, the booster belt being driven only by the main belt.

FERDINAND F. WAECHTER.
WILLIAM S. CAMPBELL.